(12) United States Patent
Corghi

(10) Patent No.: US 6,708,419 B2
(45) Date of Patent: Mar. 23, 2004

(54) SELF-CENTERING DEVICE FOR SUPPORTING HEADS OR SENSORS FOR CHECKING THE ATTITUDE OF VEHICLE WHEELS

(75) Inventor: Remo Corghi, Correggio (IT)

(73) Assignee: Corshi S.p.A, Correggio (Reggio Emilia) (IT)

( * ) Notice: Subject to any disclaimer, the term of this patent is extended or adjusted under 35 U.S.C. 154(b) by 0 days.

(21) Appl. No.: 10/144,795

(22) Filed: May 15, 2002

(65) Prior Publication Data

US 2002/0170194 A1 Nov. 21, 2002

(30) Foreign Application Priority Data

May 15, 2001 (IT) ...................................... RE2001A0053

(51) Int. Cl.[7] .............................................. G01D 21/00
(52) U.S. Cl. ..................................... 33/520; 33/203.18
(58) Field of Search ........................ 33/520, 600, 644, 33/203, 203.18, 203.19, 203.2; 73/146

(56) References Cited

U.S. PATENT DOCUMENTS

| | | | | |
|---|---|---|---|---|
| 4,453,315 A | * | 6/1984 | Mosiman et al. | 33/600 |
| 4,800,651 A | * | 1/1989 | Hanlon | 33/600 |
| 5,369,602 A | * | 11/1994 | Naas et al. | 33/600 |
| 5,987,761 A | * | 11/1999 | Ohnesorge | 33/203.19 |
| 6,131,293 A | * | 10/2000 | Maioli et al. | 33/203 |
| 6,138,366 A | * | 10/2000 | Boess | 33/520 |
| 6,282,799 B1 | * | 9/2001 | Warkotsch | 33/203 |

FOREIGN PATENT DOCUMENTS

IT  224605  5/1991

\* cited by examiner

Primary Examiner—Diego Gutierrez
Assistant Examiner—Yaritza Guadalupe
(74) Attorney, Agent, or Firm—Browdy and Neimark

(57) ABSTRACT

A device for supporting checking heads or sensors, to be coupled to vehicle wheel rims, presents a central member having on one side the support for the head or sensor and comprising, on the opposite side, self-centering means carrying elements for engaging structural parts of the wheel rim which lie on a circumference coaxial therewith, and means for operating said self-centering means.

5 Claims, 3 Drawing Sheets

Figure 1:
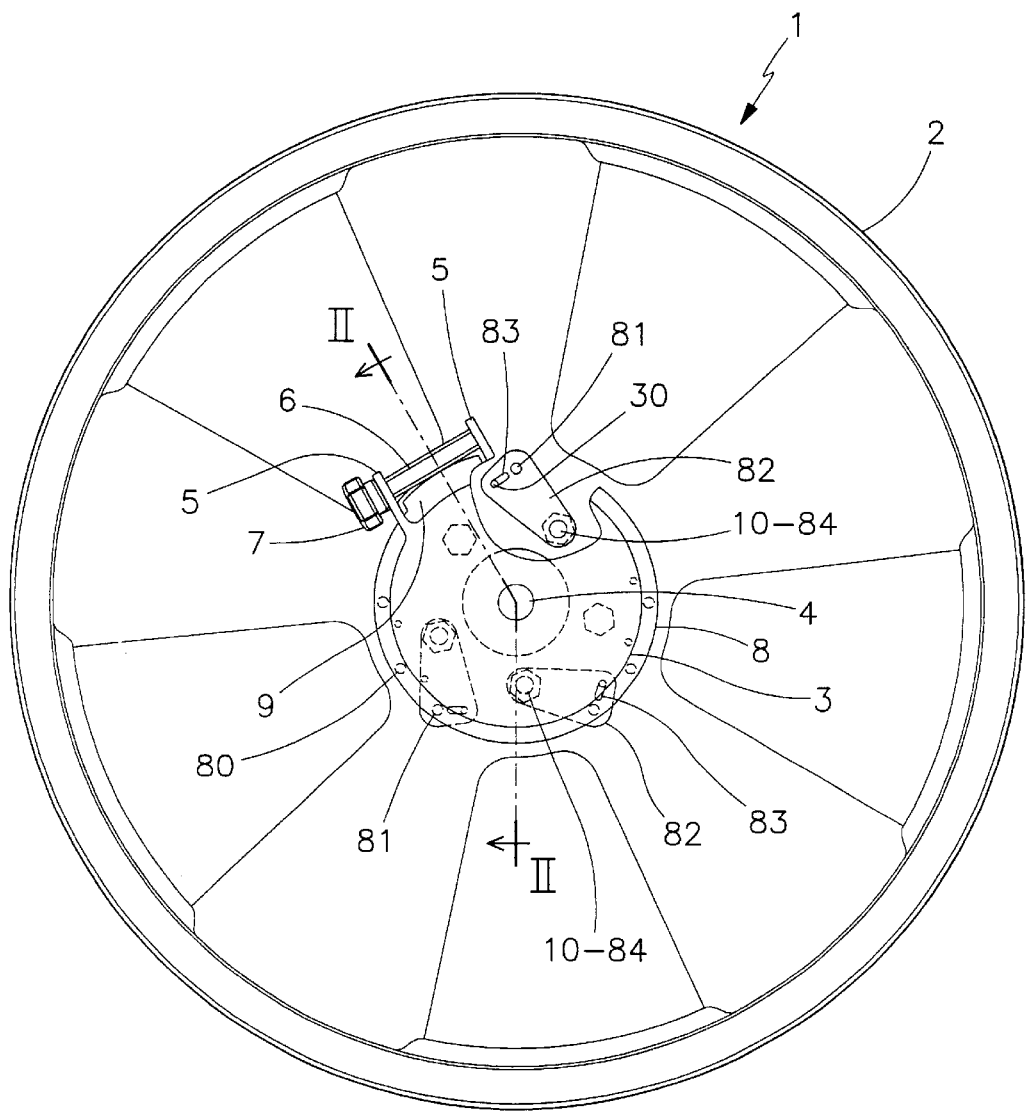

SELF-CENTERING DEVICE FOR SUPPORTING HEADS OR SENSORS FOR CHECKING THE ATTITUDE OF VEHICLE WHEELS

This invention generally relates to a device or bracket to be associated with motor vehicle wheels in general to support measuring instruments, for example the heads with which vehicle attitude checking systems are provided.

The devices of known type generally comprise a frame which is provided on one side with movable clamps to grip the wheel rim edge, and on the opposite side, on the barycentric axis, with a pin on which the measuring instruments or heads are suspended. The movable clamps are supported by the frame such that they always move by the same extent with respect to the frame centre, i.e. they always lie on a circumference of predefined diameter having its centre on that of the pin support frame.

When the device is associated with a wheel rim, the clamps grip the wheel rim bead retention flange, their ends being inserted below the edge of the tire.

One of these devices is fully described in Utility Model No. 224605 in the name of the same Applicant, to which reference should be made for a complete description.

Such known devices are suitable for wheel rims on which tires of traditional type are mounted, but cannot be used on wheel rims carrying tires of the new generation, usually known as run-flat tires, which can be used over long distances even when deflated. By way of example, these new tire types include that produced by the Michelin Co. with the name of SYSTEM PAX.

With wheels carrying such tires, the tire edge is perfectly flush with the wheel rim edge, there therefore being no space for coupling the clamps to the wheel rim.

Another problem arising with devices or brackets of known type derives from the fact that they can damage the wheel rim, particularly if this is of light alloy, and especially if painted.

The object of this invention is to overcome the aforesaid drawbacks by means of a simple and rational solution.

The invention attains said object by a device for supporting attitude checking heads and sensors for motor vehicles in general which can be coupled to any type of wheel rim, independently of the type of tire mounted thereon.

Specifically, the device of the invention comprises a central member, such as a disc, provided on one side with the support pin for the measuring heads, and on the opposite side with self-centering means carrying elements for engaging structural parts of the wheel rim which lie on a circumference coaxial therewith, and means for operating said self-centering means.

According to a preferred mode of implementing the invention, said self-centering means consist of at least three levers hinged together and to suitable operating means able to rotate them in the same direction through the same extent.

At their end, said levers carry means for coupling them to the central hole of the wheel rim or, alternatively, to the heads of the bolts which fix it to the vehicle, or to the holes through which said bolts pass.

The special characteristics of the invention are defined in the claims.

The constructional and functional characteristics of the invention will be more apparent from the ensuing description of a preferred embodiment thereof given by way of non-limiting example and illustrated in the accompanying drawings.

Figure 2:
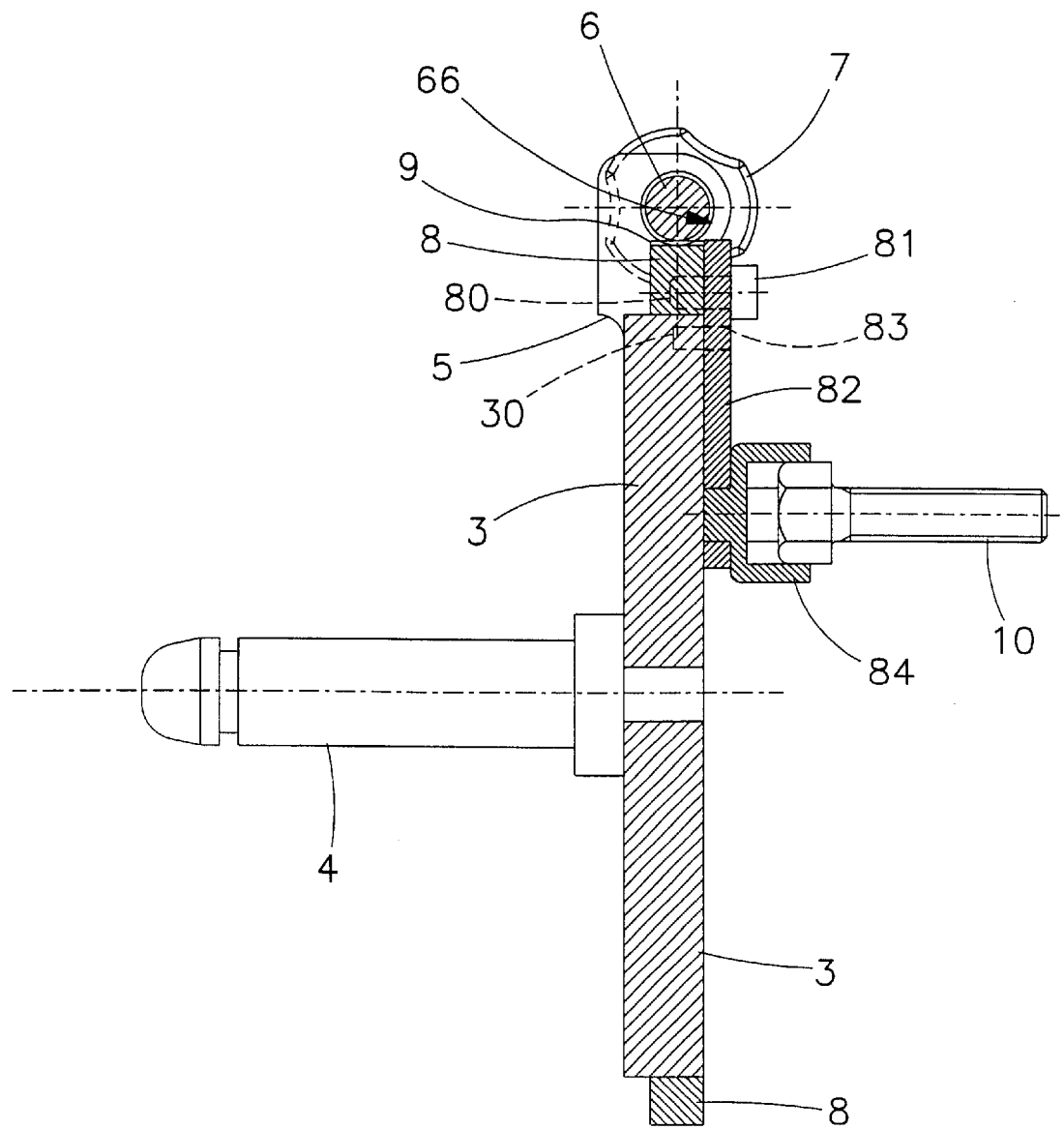
Figure 3:
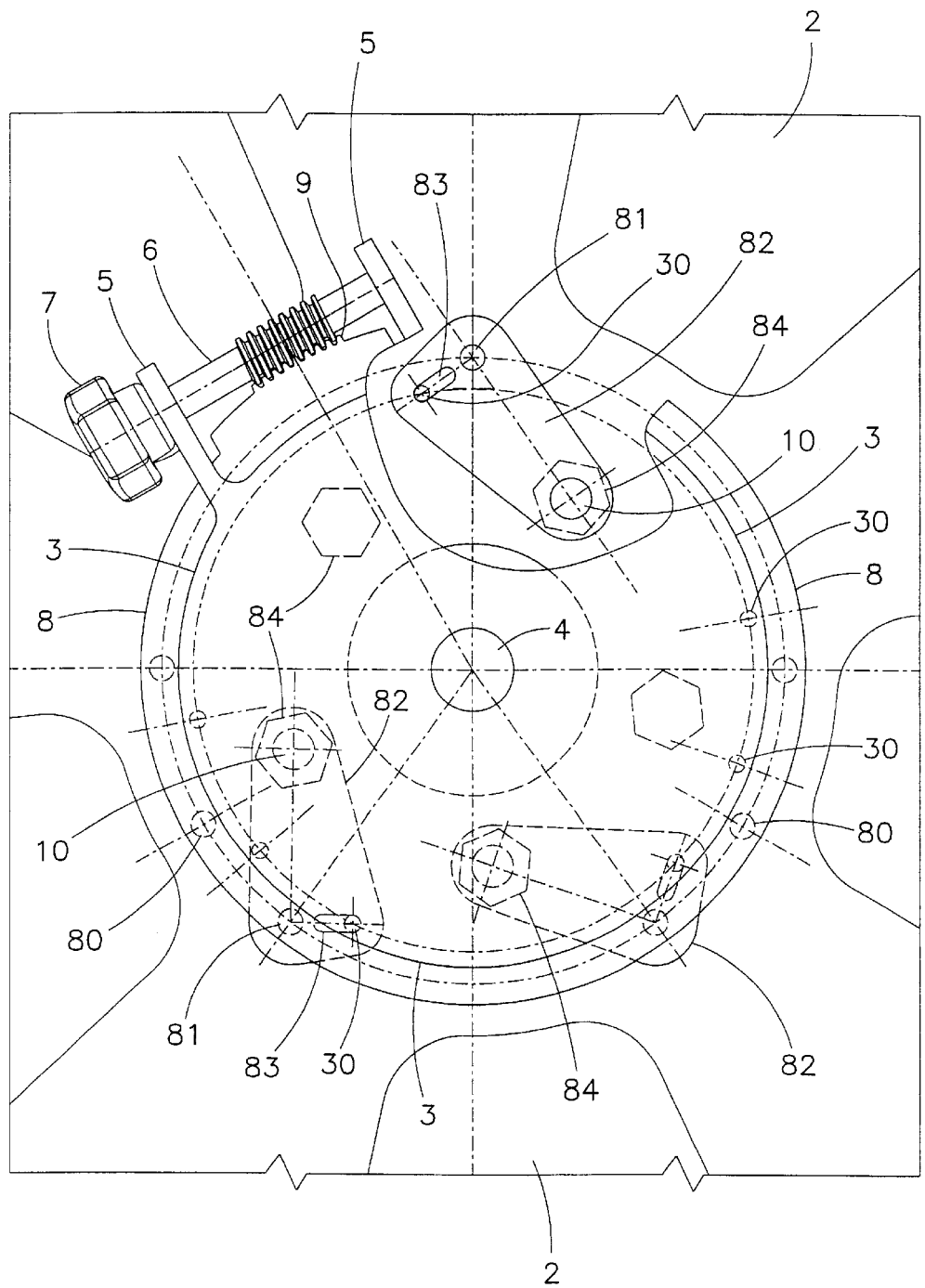

FIG. 1 is a front view of the invention.
FIG. 2 is the section II—II indicated in FIG. 1.
FIG. 3 is an enlarged detail of FIG. 1.

Said figures show the device, indicated overall by 1, associated with the wheel rim 2 of a vehicle, not shown.

The device 1 comprises a disc 3, shown in FIG. 2, from which a central pin 4 extends to receive and support a measuring head of known type, not shown.

The disc 3 presents two parallel appendices 5 provided with a hole 66 holding a threaded rod or stem 6 provided with an end operating knob 7. A ring 8 is mounted and retained about the outside of the disc 3, and is peripherally provided with a toothed circular sector 9 with which the thread of said rod 6 is engaged so that rotation of the knob 7 causes the ring 8 to rotate about the disc 3. Said ring presents a circumferential series of angularly equidistant threaded holes 80.

The holes 80 receive a like number of bolts 81 which act as rotation pins for the same number of plates 82. The plates 82 each comprise a hole to receive the bolt 81, and a slot 83 aligned with said hole.

The disc 3 comprises the projecting pins 30 in a number equal to the number of holes 80, to be each received in one of the slots 83.

Each of the plates 82 carries at its free end an engagement means 84 which in the illustrated example is shaped as the end of a socket wrench.

Said engagement means fits onto the head of one of the bolts 10 which fix the wheel rim to the vehicle.

Instead of the socket-shaped end, the engagement means can be a simple projecting pin to engage the edge of the hub hole.

From the aforegoing description it is clear that rotating the knob 7 results in rotation of plates 82, which define the circumference on which the axes of the engagement means 84 lie, in order to adapt the circumference to that on which the bolts 10 lie. When the socket-shaped ends have engaged the bolts, the knob 7 is slightly tightened to lock the entire device in a position perfectly coaxial with the wheel rim.

The same applies if instead of the bolts, simple pins are provided to engage the inner edge of the hub hole in the wheel rim.

What is claimed is:
1. A device for supporting checking heads or sensors, to be coupled to a vehicle wheel rim, said device comprising:

a disc shaped central member having on one side thereof a support for the head or sensor, said central member being provided with at least three projecting pins, a circular ring which is positioned about the outside of said central member, at least three levers hinged on equidistant bolts positioned on the same circumference of said circular ring and positioned on the other side of said central member, each of said levers being provided with a slot into which there is inserted a respective one of said projecting pins, said levers being provided with engagement elements for engaging structural parts of the wheel rim, and means for causing said ring and said central member to undergo controlled rotations relative to one another.

2. The device of claim 1, wherein said engagement elements are each shaped as a socket wrench to be fitted onto the head of one of the bolts which fix the wheel rim to the vehicle.

3. The device of claim 1, wherein said engagement elements are shaped as further projecting pins to engage the interior of the edge of the hub hole in the wheel rim.

4. The device of claim 1, wherein said means for causing said ring and said central member to undergo controlled relative rotations comprise a freely rotatable threaded rod that is associated tangentially with said central member and in which there engages a toothed circular sector associated with said ring.

5. The device of claim 1, wherein each of said slots extends rectilinearly and has an axis aligned with a respective one of said bolts.

* * * * *